(12) United States Patent
Okamura et al.

(10) Patent No.: US 8,377,250 B2
(45) Date of Patent: Feb. 19, 2013

(54) METHOD FOR ADHESION OF RESIN MATERIAL COMPRISING OXYMETHYLENE POLYMER, AND STRUCTURE

(75) Inventors: Akira Okamura, Mie (JP); Satoshi Nagai, Mie (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 634 days.

(21) Appl. No.: 12/517,472

(22) PCT Filed: Dec. 3, 2007

(86) PCT No.: PCT/JP2007/073344
§ 371 (c)(1),
(2), (4) Date: Sep. 25, 2009

(87) PCT Pub. No.: WO2008/069183
PCT Pub. Date: Jun. 12, 2008

(65) Prior Publication Data
US 2010/0041854 A1 Feb. 18, 2010

(30) Foreign Application Priority Data
Dec. 4, 2006 (JP) .................. 2006-327654

(51) Int. Cl.
B32B 27/00 (2006.01)
B32B 37/24 (2006.01)
B29C 47/00 (2006.01)
B29C 65/00 (2006.01)
B29C 37/00 (2006.01)
C08J 5/00 (2006.01)
C04B 37/00 (2006.01)
C08G 12/00 (2006.01)

(52) U.S. Cl. .............. 156/325; 156/242; 156/244.11; 156/308.2; 528/230

(58) Field of Classification Search .......... 156/242, 156/244.11, 308.2, 325; 528/230
See application file for complete search history.

(56) References Cited

U.S. PATENT DOCUMENTS

| 4,816,107 A | 3/1989 | Collins et al. |
| 4,954,400 A | 9/1990 | Collins et al. |
| 2001/0007006 A1 * | 7/2001 | Tanimura et al. ............. 525/398 |

FOREIGN PATENT DOCUMENTS

| EP | 0 308 187 A2 | 3/1989 |
| EP | 0 308 187 A3 | 3/1989 |
| EP | 0 364 207 A2 | 4/1990 |
| EP | 0 364 207 A3 | 4/1990 |
| JP | 01 132638 | 5/1989 |
| JP | 2 166184 | 6/1990 |
| JP | 08 060125 | 3/1996 |
| WO | 02 077049 | 10/2002 |

OTHER PUBLICATIONS

U.S. Appl. No. 12/517,418, filed Jun. 3, 2009, Okamura, et al.
Extended European Search Report issued Jun. 21, 2011, in Patent Application No. 07832964.6.

* cited by examiner

*Primary Examiner* — Michael Orlando
(74) *Attorney, Agent, or Firm* — Oblon, Spivak, McClelland, Maier & Neustadt, L.L.P.

(57) ABSTRACT

Provided are a method of bonding a resin material (X) containing an oxymethylene-based polymer (A) and a resin material (Y), including: preparing an oxymethylene-based polymer composition (B) as resin material (Y), and resin material (X); or preparing resin material (X) and a resin material identical to resin material (X) or another resin material as resin material (Y), and providing polymer composition (B) between resin material (Y) and resin material (X); and heating: wherein polymer composition (B) has a melting point lower than that of polymer (A), and a difference in melting point between the composition and the polymer is smaller than 5° C.; and 50% or more of a peak area determined from a peak showing the molten state of polymer composition (B) measured by DSC is present in a temperature region lower than the peak temperature of polymer (A) by 5° C. or more; and a structure obtained thereby.

7 Claims, No Drawings

METHOD FOR ADHESION OF RESIN MATERIAL COMPRISING OXYMETHYLENE POLYMER, AND STRUCTURE

TECHNICAL FIELD

The present invention relates to a method of bonding resin materials each containing an oxymethylene-based polymer, the method involving using an oxymethylene-based polymer having a specific melting point and melting peak for bonding the resin materials, and a structure (a structural body) obtained by the bonding method.

BACKGROUND ART

In recent years, to cope with environmental problems on the global scale, and in order to prevent industrial wastes from contaminating the environment, reductions in a necessary heat quantity and a $CO_2$ amount to be generated at the time of a thermal disposal have been attracting attention. As a result, there has been growing interest in recovery and recycling of materials.

Oxymethylene-based polymers are each an aliphatic ether type polymer or a polymer mainly composed of an aliphatic ether, and are each mainly derived from methanol as a raw material which a person can obtain without being in dependence on petroleum, so each of the polymers is considered to be a material that places a light load on an environment. The polymers are excellent materials that have been widely used in engineering plastics at present because of their high mechanical characteristics such as rigidity.

Known examples of the method of bonding resin materials each containing an oxymethylene-based polymer include: a method involving subjecting the materials to ultrasonic fusion in consideration of the fact that the surface of each of the materials is chemically inert; and a method involving roughening the surface of each of the oxymethylene-based polymers in advance or modifying the surface with an electron beam or by a plasma treatment in advance and bonding the materials with a cyanoacrylate-based adhesive or an epoxy-based adhesive. The former method requires a complicated step or a complicated facility, and is applicable only to part of the injection-molded articles. In addition, the latter method involves the following problems: the method cannot provide a sufficient bonding effect on the materials, and is not preferable in terms of recycling property because a component except the oxymethylene-based polymers must be used. In view of the foregoing, a technology for bonding resin materials each containing an oxymethylene-based polymer with a material composed of an oxymethylene-based polymer of the same kind has been desired.

The application of an oxymethylene-based amorphous copolymer (see Patent Document 1) or a copolymer having a low melting point (see Patent Document 2) to the bonding of oxymethylene-based polymers is proposed. The application of the former material shows insufficient practicability because a bonding strength between the polymers is not sufficient, and the amorphous copolymer has so low a melting point that a product obtained after the bonding is poor in heat resistance. On the other hand, a bonding strength between the polymers in the case of the application of the latter material is significantly improved as compared to that in the case of the application of the former material, and a bonding component, that is, the latter material has improved heat resistance as compared to that of the former material, but a product obtained after the bonding is still so poor in heat resistance that the product cannot be used in the same environment as an environment where a conventional oxymethylene-based polymer is used.

In addition, an oxymethylene-based polymer is a resin having high crystallinity, so the polymer involves the following problem: upon bonding of injection-molded articles, extrusion-molded articles, or stretched materials each containing the polymer, a heat history for the bonding at a high temperature or for a long period of time results in the thermal contraction of each of the polymers more than expected, and, furthermore, the melting of the raw material for any such article or material except the oxymethylene-based polymer cannot be ignored, with the result that a structure accurately maintaining its shape cannot be produced.

The inventors of the present invention have already developed an oxymethylene copolymer having a large comonomer content. The copolymer has a moderately low melting point as compared to that of the conventional oxymethylene copolymer, but the inventors have not referred to anything about the effectiveness of the copolymer as an adhesive (see Patent Document 3).

Patent Document 1: JP 01-132638 A
Patent Document 2: JP 08-60125 A
Patent Document 3: WO 2002-077049 A

DISCLOSURE OF THE INVENTION

Problem to be solved by the Invention

An object of the present invention is to provide a method of boding resin materials each containing an oxymethylene-based polymer by which adhesiveness between the resin materials can be improved, and the thermal contraction and thermal deformation of a structure obtained by the bonding method can be suppressed, and a structure obtained by the bonding method.

Means for solving the Problems

The inventors of the present invention have made extensive studies with a view to solving the above-mentioned problems. As a result, the inventors have conceived the present invention in which, upon bonding of resin materials each containing an oxymethylene-based polymer, heat treatment is performed by using a resin material containing an oxymethylene-based polymer which has a specific difference in melting point with respect to the melting point of the oxymethylene-based polymer in one of the resin materials and the melting peak of which obtained by DSC measurement satisfies a predetermined relationship as (1) the other material or (2) a bonding layer. Then, as a result, the inventors have found that adhesiveness between the materials can be improved without the occurrence of a problem such as the thermal contraction or thermal deformation of a structure obtained by the bonding.

The present invention provides a method of bonding resin materials for bonding a resin material (X) containing an oxymethylene-based polymer (A) and a resin material (Y), the method including comprising the steps of:

preparing as the resin material (Y) an oxymethylene-based polymer composition (B) satisfying the following conditions (1) and (2); or preparing as the resin material (Y) the resin material (X) or another resin material and providing the oxymethylene-based polymer composition (B) between the resin material (Y) and the resin material (X); and heating the resin materials:

(1) the oxymethylene-based polymer composition (B) has a melting point lower than a melting point of the oxymethylene-based polymer (A), and a difference in melting point between the composition and the polymer is smaller than 5° C.; and (2) 50% or more of a peak area determined from a peak showing a molten state of the oxymethylene-based polymer composition (B) measured by DSC is present in a temperature region lower than a peak temperature of the oxymethylene-based polymer (A) by 5° C. or more.

In addition, the present invention provides a structure obtained by the above-mentioned bonding method.

Effects of the Invention

According to the present invention, there can be provided a method of boding resin materials each containing an oxymethylene-based polymer by which adhesiveness between the resin materials can be improved, and the thermal contraction and thermal deformation of a structure obtained by the bonding method can be suppressed, and a structure obtained by the bonding method.

BEST MODE FOR CARRYING OUT THE INVENTION

[Method of Bonding Resin Materials]

A method of bonding resin materials of the present invention is a method of bonding a resin material (X) containing an oxymethylene-based polymer (A) and a resin material (Y) by heat treatment. Hereinafter, various materials and a condition for heat treatment will be described.

(Resin Material (X) Containing Oxymethylene-Based Polymer (A))

Examples of the oxymethylene-based polymer (A) include oxymethylene homopolymers and oxymethylene block copolymers generally available in the market. Of those, the oxymethylene-based polymer (A) including a repeating unit represented by the following general formula (1) and a copolymerized product of trioxane and one or more kinds of comonomers in an amount of 0.5 to 30.0 parts by mass with respect to 100 parts by mass of trioxane is preferable. The amount of the comonomers with respect to 100 parts by mass of trioxane is more preferably 0.5 to 10.0 parts by mass.

(1)

In the above formula (1), $R^1$ and $R^2$ each independently represent a hydrogen atom, an alkyl group, an organic group having an alkyl group, a phenyl group, or an organic group having a phenyl group, and m represents an integer of 1 to 6. The alkyl group is, for example, an alkyl group having 1 to 8 carbon atoms.

Examples of the above comonomers include a cyclic formal and a cyclic ether. Specific preferable examples of the comonomers include: 1,3-dioxolane and a derivative of 1,3-dioxolane; 1,3-dioxepane and a derivative of 1,3-dioxepane; 1,3,5-trioxepane and a derivative of 1,3,5-trioxepane; 1,3,6-trioxocane and a derivative of 1,3,6-trioxocane; and a monofunctional glycidyl ether.

The content of the oxymethylene-based polymer (A) in the resin material (X) is preferably 50 vol % or more; the resin material (X) is more preferably composed of the oxymethylene-based polymer (A).

(Resin Material (Y))

An oxymethylene-based polymer composition (B) in the resin material (Y) satisfies the following conditions (1) and (2).

(1) The oxymethylene-based polymer composition (B) has a melting point lower than that of the oxymethylene-based polymer (A), and a difference in melting point between the composition and the polymer is smaller than 5° C. When the difference in melting point is equal to or larger than 5° C., the component (B) remarkably deforms owing to melting at the time of the bonding of the materials.

(2) 50% or more of a peak area determined from a peak showing the molten state of the oxymethylene-based polymer composition (B) measured by DSC is present in a temperature region lower than the peak temperature of the oxymethylene-based polymer (A) by 5° C. or more.

In addition, when the temperature region accounts for less than 50% of the melting peak area, the temperature at which the materials are to be bonded to each other is extremely close to the melting point of the oxymethylene-based polymer (A), so the extent to which the resin material (X) thermally contracts enlarges, and, in worse cases, the material may thermally deform or melt to deteriorate the shape of a product obtained after the bonding. 50% or more of the peak area of the oxymethylene-based polymer composition (B) is preferably present in a temperature region lower than the peak temperature of the oxymethylene-based polymer (A) by 10° C. or more.

A large amount of a component having heat resistance close to that of the oxymethylene-based polymer (A) may be present in the oxymethylene-based polymer composition (B). Accordingly, when the component (B) satisfies the above conditions (1) and (2), the following problem can be avoided: the component (B) remarkably deforms owing to melting at the time of the bonding of the materials, or a sufficient bonding strength between the materials cannot be obtained.

The oxymethylene-based polymer composition (B) is preferably a copolymerized product of trioxane and one or more kinds of comonomers in an amount of 5.0 to 50.0 parts by mass with respect to 100 parts by mass of trioxane, the copolymerized product being represented by the general formula (1) as in the case of the foregoing. The amount of the above comonomers with respect to 100 parts by mass of trioxane is more preferably 10.0 to 50.0 parts by mass.

In order that the oxymethylene-based polymer composition (B) may satisfy the above-mentioned conditions (1) and (2), for example, the comonomer components in the component (B) are provided with a content distribution. To be specific, for example, two or more oxymethylene-based polymers different from each other in comonomer content have only to be mixed with each other.

When the resin material (Y) contains the oxymethylene-based polymer composition (B), the content of the polymer composition (B) is preferably 50 vol % or more; the material is preferably constituted only of the polymer (B).

In addition, when the resin material (Y) is free of the oxymethylene-based polymer composition (B), that is, when the oxymethylene-based polymer composition (B) serves as a bonding layer for bonding the resin material (X) and the resin material (Y), any other material may be used in combination with the resin materials as long as the other material is mainly composed of the polymer (B).

It should be noted that the resin material (Y) when the oxymethylene-based polymer composition (B) is used as a bonding layer may be a material identical to or different from the resin material (X). Examples of the material different from the resin material (X) include a material different from the resin material (X) in content of the oxymethylene-based polymer (A) and a material containing a different component as that of the resin material (X) except the oxymethylene-based polymer (A).

(Condition for Heat Treatment)

The condition for heat treatment (condition for the bonding) is preferably as follows: the treatment is performed at a temperature lower than the melting point of the oxymethylene-based polymer (A) and equal to or higher than a temperature at which the oxymethylene-based polymer composition (B) starts to melt. When heat treatment is performed at a temperature lower than the above melting point, the thermal contraction of the material containing the oxymethylene-based polymer (A) is suppressed, and the material can be prevented from thermally deforming or melting to deteriorate the shape of a product obtained after the bonding. In addition, when heat treatment is performed at a temperature equal to or higher than the temperature at which the oxymethylene-based polymer composition (B) starts to melt, a sufficient bonding strength can be imparted to the materials.

The condition for heat treatment is preferably as follows: the treatment is performed at a temperature lower than the melting point of the oxymethylene-based polymer (A) by 5° C. or more and equal to or higher than the temperature at which the oxymethylene-based polymer composition (B) starts to melt.

It should be noted that a known additive or filler can be added to the material containing an oxymethylene-based polymer of the present invention, which contains mainly the above oxymethylene-based polymer, to such an extent that an original object of the present invention is not impaired.

Examples of the additive include a crystal nucleating agent, an antioxidant, a plasticizer, a delustering agent, a foaming agent, a lubricant, a release agent, an antistatic agent, a UV absorber, a light stabilizer, a heat stabilizer, a deodorant, a flame retardant, a sliding agent, a perfume, and an antibacterial agent. In addition, examples of the filler include a glass fiber, talc, mica, calcium carbonate, and a potassium titanate whisker. Further, a pigment or a dye can be added to the material in order that the material may be finished in a desired color. In addition, the material can be denatured by adding, for example, any one of various monomers, a coupling agent, a terminal treating agent, any other resin, wood dust, or starch.

Further, the form of each of the resin material (X) and the resin material (Y) according to the present invention is not limited; each of the materials is preferably an injection-molded article, an extrusion-molded article, a stretch-molded article, or a molded article obtained by the secondary processing of each of the articles. Other examples of the form include, but not limited to, a blow-molded article, a film, a sheet, a fiber, a multifilament, a monofilament, a rope, a net, a fabric, a knitted fabric, a non-woven fabric, a filter, and a material obtained by the secondary processing of each of them. When the materials are thermally bonded to each other with the oxymethylene-based polymer (B) interposed between them, the manner in which the oxymethylene-based polymer product (B) is interposed between the materials is preferably, for example, as follows: the oxymethylene-based polymer composition (B) is caused to be present in a layer shape or as a domain on the surface of the resin material (A) in advance.

Alternatively, irrespective of whether the oxymethylene-based polymer composition (B) is continuous (a layer shape, a rod shape, or a wavy shape) or discontinuous (a domain shape or a dot shape), the polymer may be placed in advance on the surface of the material containing the oxymethylene-based polymer (A) simultaneously with, or sequentially during, the primary processing of the material. The oxymethylene-based polymer composition (B) may be interposed between the materials during a process commencing on the completion of the primary processing of the material containing the oxymethylene-based polymer (A) and ending on the completion of the formation of a structure.

[Structure]

A structure of the present invention can be obtained by the method of bonding resin materials of the present invention described above. The structure shows good adhesiveness between resin materials each containing an oxymethylene-based polymer, and the thermal contraction and thermal deformation of the structure are suppressed.

Such structure may be used as it is, or may be additionally processed. For example, the structure can be turned into a structure in which at least one kind of a resin material containing the oxymethylene-based polymer (A) is constituted of multiple layers by repeating, or simultaneously performing, similar bonding operations. In addition, an additionally sophisticated structure can be formed by newly bonding a structure obtained by bonding resin materials to each other once to another resin material with a different shape containing the oxymethylene-based polymer (A).

For example, a layer structure when the structure is a multi-layered fiber is as follows: the section of one fiber has two or more layers exposed to the surface of the fiber, and the components of which the layers are constituted are composed of at least the above two components, that is, the resin materials (X) and (Y). The ratio at which the layers are exposed to the surface is not particularly limited; the higher the ratio at which the resin material (Y) which has a low melting point and which functions as a bonding layer at the time of its secondary processing (in particular, the oxymethylene-based polymer (B) component) is exposed, the better a bonding strength between the materials (X) and (Y). Accordingly, the resin material (Y) may be formed into multiple layers separate from each other.

Hereinafter, the present invention will be described more specifically by way of examples. However, the present invention is not limited to the following specific examples.

It should be noted that materials used in the examples, a method of measuring a melting point, and a bonding method and a judgement criterion are shown below.

(Resin Material)

A Iupital A40 (hereinafter referred to as "oxymethylene-based polymer (a)") manufactured by Mitsubishi Engineering-Plastics Corporation and having melting point of 172° C. was used as the resin material (X). The oxymethylene-based polymer (a) was subjected to melt spinning to be processed into a multifilament having a stretch ratio of 4 and a single fiber fineness of 5 dtex.

Products each obtained by the melt blending of the oxymethylene-based polymer (a) and a Iupital V40 (hereinafter referred to as "resin (b)") manufactured by Mitsubishi Engineering-Plastics Corporation and having a melting point of 155° C. at a mass ratio of 1:1, 1:2, or 3:1 (referred to as "(b-1)", "(b-2)", and "(b-3)", respectively) were each subjected to melt spinning to be processed into a multifilament having a stretch ratio of 1 and a single fiber fineness of 5 dtex. The resultant molded articles were each used as the resin material (Y).

(Method of Measuring Melting Point)

The temperature of a resin material was increased from 30° C. to 210° C. at a rate of 10° C./min, and the peak melting temperature of the material was measured with a differential scanning calorimeter (DSC6200 manufactured by Seiko Instruments Inc.) and defined as a melting point. In addition, the ratio of the peak area of the resin material (Y) in each of a temperature region lower than the peak melting temperature of the oxymethylene-based polymer (a) by 5° C. or more and a temperature region lower than the peak melting temperature by 10° C. or more was determined as a ratio of the quantity of absorbed heat of the corresponding region to the quantity of absorbed heat (mJ/mg) of the entire peak by using a manual fractional integration analysis mode.

(Bonding Method and Judgement Criterion)

The multifilament of the resin material (X) was cut into a piece having a length of 10 cm. The piece was placed on an iron plate in a linear fashion. Next, the multifilament of the resin material (Y) was cut into a piece having a length of 3 cm. The piece was placed on the piece made of the resin material (X) so as to cross the piece, and the pieces were sandwiched between the above iron plate and another iron plate. The resultant was subjected to a thermal bonding treatment (heat treatment) with a hydraulic hot pressing device, which had been heated in advance to a temperature shown in Table 1 below, for a predetermined time under heat and pressure.

After the treatment, a state where the resin material (X) and the resin material (Y) were bonded to each other was visually observed, and whether or not each of the materials melted was observed. In addition, the length of the resin material (X) after the treatment was measured, and the percentage by which the material thermally contracted after the treatment as compared to its length before the treatment was measured.

Examples 1 to 4

The resin material (X) and the resin material (Y) were bonded to each other by the above-mentioned bonding method under the conditions shown in Table 1 below. Table 1 shows the results of evaluation.

Comparative Examples 1 to 3

The resin material (X) and the resin material (Y) were bonded to each other by the above-mentioned bonding method under the conditions shown in Table 1 below. Table 1 shows the results of evaluation.

TABLE 1

| | Resin material (X) [oxy-methylene-based polymer (A)] | Resin material (Y) [oxy-methylene-based polymer (B)] | Difference in melting point between (A) and (B) (° C.) | Ratio of melting peak area of (B) in specific region (%) | | Hot pressing temperature (° C.) | Hot pressing time (min) | Bonding state | State of resin material (X) after hot pressing | Percentage by which resin material (X) contracted (%) |
|---|---|---|---|---|---|---|---|---|---|---|
| | | | | Temperature region lower than peak temperature of (A) by 5° C. or more | Temperature region lower than peak temperature of (A) by 10° C. or more | | | | | |
| Example 1 | (a) | (b-1) | 1 | 56 | 51 | 155 | 90 | Bonded | Not melted | 4.9 |
| Example 2 | (a) | (b-1) | 1 | 56 | 51 | 160 | 30 | Bonded | Not melted | 8.7 |
| Example 3 | (a) | (b-2) | 2 | 64 | 56 | 155 | 90 | Bonded | Not melted | 4.9 |
| Example 4 | (a) | (b-2) | 2 | 64 | 56 | 160 | 30 | Bonded | Not melted | 8.7 |
| Comparative Example 1 | (a) | (b-3) | 0 | 35 | 25 | 165 | 90 | Not bonded | Not melted | — |
| Comparative Example 2 | (a) | (b-3) | 0 | 35 | 25 | 170 | 30 | Bonded | Melted to some extent | 12.2 |
| Comparative Example 3 | (a) | (b-3) | 0 | 35 | 25 | 175 | 30 | Bonded | Melted | 7.1 |

(a): A multifilament composed of a Iupital A40 having a melting point of 172° C.
(b-1):(a) A multifilament which contains (a) and a Iupital V40 (the resin (b)) having a melting point of 155° C. at a mass ratio of 1:1 and which shows a melting point of 171° C.
(b-2):(a) A multifilament which contains (a) and the resin (b) at a mass ratio of 1:2 and which shows a melting point of 170° C.
(b-3):(a) A multifilament which contains (a) and the resin (b) at a mass ratio of 3:1 and which shows a melting point of 172° C.

The invention claimed is:

1. A method of bonding resin materials for bonding a resin material (X) containing an oxymethylene-based polymer (A) and a resin material (Y), comprising:
    preparing an oxymethylene-based polymer composition (B) as the resin material (Y), and the resin material (X) containing the oxymethylene-based polymer (A); or
    preparing the resin material (X) containing the oxymethylene-based polymer (A) and a resin material identical to the resin material (X) or another resin material as the resin material (Y), and providing the oxymethylene-based polymer composition (B) between the resin material (Y) and the resin material (X); and
    bonding the resin material (X) and the resin material (Y) by placing resin material (X) and resin material (Y) in contact with one another, either directly or by way of oxymethylene-based polymer composition (B) therebetween, and heating the resin materials,
    wherein the oxymethylene-based polymer (A) comprises a repeating unit represented by the following general formula (1) and is a copolymerized product of trioxane and one or more kinds of comonomers in an amount of 0.5 to 30.0 parts by mass with respect to 100 parts by mass of trioxane,
    the oxymethylene-based polymer composition (B) comprises a repeating unit represented by the following general formula (1) and is a copolymerized product of trioxane and one or more kinds of comonomers in an amount of 5.0 to 50.0 parts by mass with respect to 100 parts by mass of trioxane:

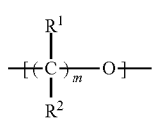

wherein $R^1$ and $R^2$ each, independently, represent a hydrogen atom, an alkyl group, an organic group having an alkyl group, a phenyl group, or an organic group having a phenyl group, and m represents an integer of 1 to 6, and the oxymethylene-based polymer composition (B) satisfies the following conditions (1) and (2):

(1) the oxymethylene-based polymer composition (B) has a melting point lower than a melting point of the oxymethylene-based polymer (A), and a difference in melting point between the composition and the polymer is smaller than 5° C.; and (2) 50% or more of a peak area determined from a peak showing a molten state of the oxymethylene-based polymer composition (B) measured by DSC is present in a temperature region lower than a peak temperature of the oxymethylene-based polymer (A) by 5° C. or more.

2. A method of bonding resin materials according to claim 1, wherein, in the condition (2), 50% or more of the peak area determined from the peak showing the molten state of the oxymethylene-based polymer composition (B) measured by DSC is present in a temperature region lower than the peak temperature of the oxymethylene-based polymer (A) by 10° C. or more.

3. A method of bonding resin materials according to claim 1, wherein heat treatment is performed at a temperature lower than the melting point of the oxymethylene-based polymer (A) and equal to or higher than a temperature at which the oxymethylene-based polymer composition (B) starts to melt.

4. A method of bonding resin materials according to claim 1, wherein the comonomers comprise at least one kind selected from the group consisting of 1,3-dioxolane and a derivative of 1,3-dioxolane, 1,3-dioxepane and a derivative of 1,3-dioxepane, 1,3,5-trioxepane and a derivative of 1,3,5-trioxepane, 1,3,6-trioxocane and a derivative of 1,3,6-trioxocane, and a monofunctional glycidyl ether.

5. A method of bonding resin materials according to claim 1, wherein the resin material (X) comprises an injection-molded article, an extrusion-molded article, a stretch-molded article, or a molded article obtained by secondary processing of each of the articles.

6. A method of bonding resin materials according to claim 1, wherein the oxymethylene-based polymer composition (B) is caused to be present in a layer shape or as a domain on a surface of the resin material (X) in advance.

7. A structure obtained by the bonding method according to claim 1.

* * * * *